United States Patent [19]

Maezawa et al.

[11] 4,312,596
[45] Jan. 26, 1982

[54] BEATING BLADE MEMBER OF BEATER

[75] Inventors: Kazuo Maezawa, Yokohama; Yasuo Doumoto, Kawasaki, both of Japan

[73] Assignee: Tokyo Electric Limited, Tokyo, Japan

[21] Appl. No.: 39,180

[22] Filed: May 15, 1979

[30] Foreign Application Priority Data

| May 24, 1978 | [JP] | Japan | 53-62012 |
|---|---|---|---|
| May 24, 1978 | [JP] | Japan | 53-62013 |
| May 24, 1978 | [JP] | Japan | 53-62014 |
| May 24, 1978 | [JP] | Japan | 53-62015 |
| May 24, 1978 | [JP] | Japan | 53-62016 |
| May 24, 1978 | [JP] | Japan | 53-62017 |

[51] Int. Cl.³ ............................................. B01F 13/00
[52] U.S. Cl. .................................................. 366/343
[58] Field of Search .............. 366/343, 314, 259, 280, 366/281, 282, 283, 297, 298, 299

[56] References Cited

U.S. PATENT DOCUMENTS

| 128,278 | 6/1872 | Barnes | 366/343 |
| 1,036,489 | 8/1912 | Hall | 366/314 |
| 1,054,201 | 2/1913 | Hathaway | 366/283 |
| 3,201,095 | 8/1965 | Erwien | |

FOREIGN PATENT DOCUMENTS 624276 6/1949 United Kingdom .

Primary Examiner—Edward J. McCarthy
Attorney, Agent, or Firm—Oblon, Fisher, Spivak, McClelland & Maier

[57] ABSTRACT

A beating blade member for beating or whipping cooking material such as egg into froth. The blade member has blades each of which has a vertically stretched and radially extending beating surface in which formed are a multiplicity of meshes. Thanks to the provision of these meshes, it is possible to obtain fine contact of the material with the blade to promote the stirring and beating. Also, these meshes effectively catch the ambient air to permit a better mixing of the material with the air. At the same time, the material is guided to flow radially inwardly, as well as in the vertical direction, so as to ensure the interference of the material with the meshes of the blades. Consequently, the material is beaten and whipped into froth in quite a short period of time.

4 Claims, 36 Drawing Figures

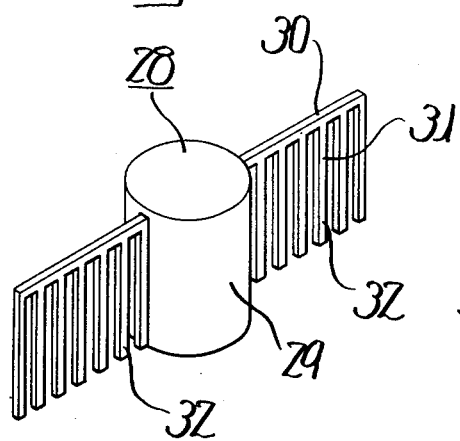
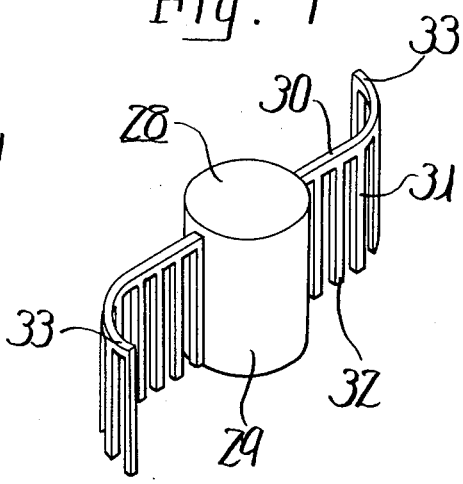
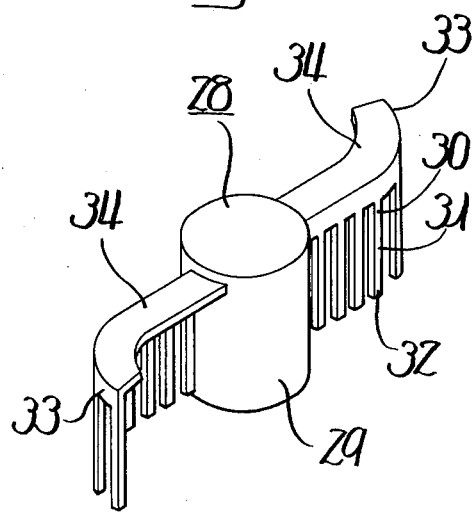

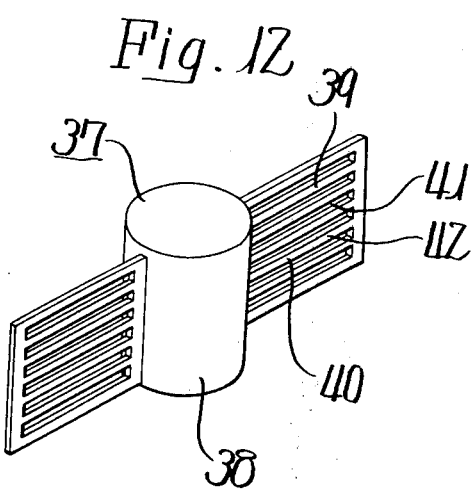
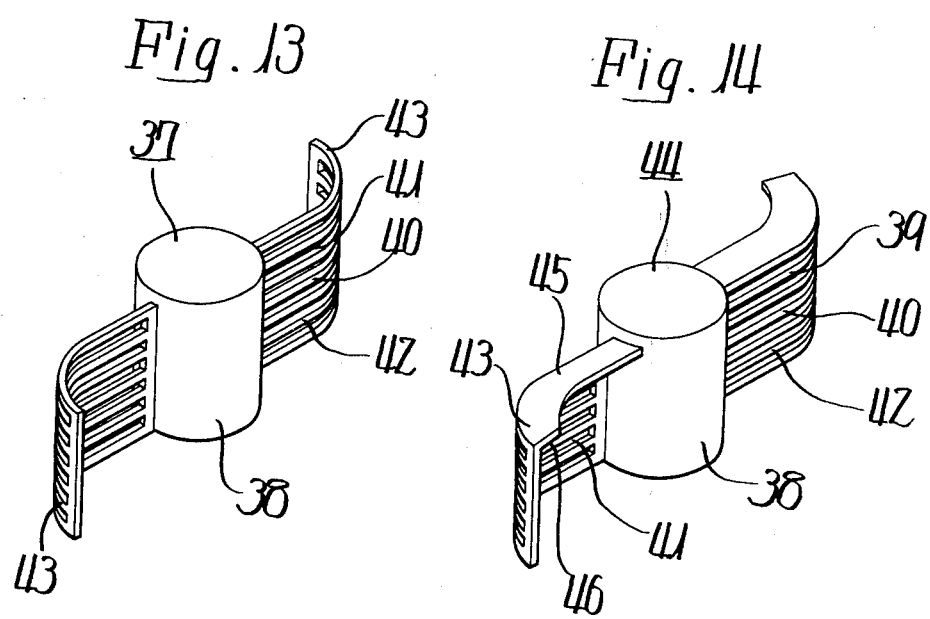

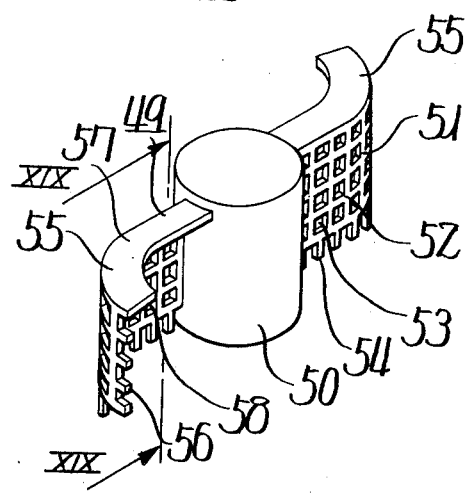
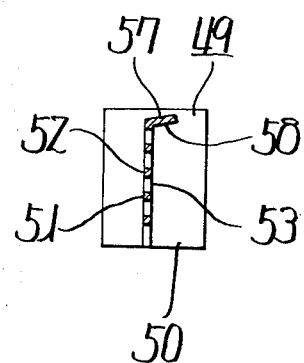
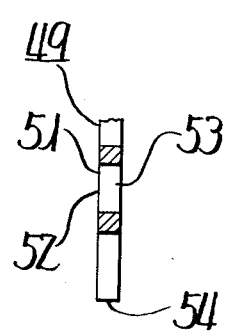
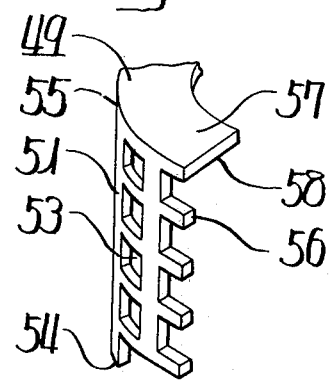

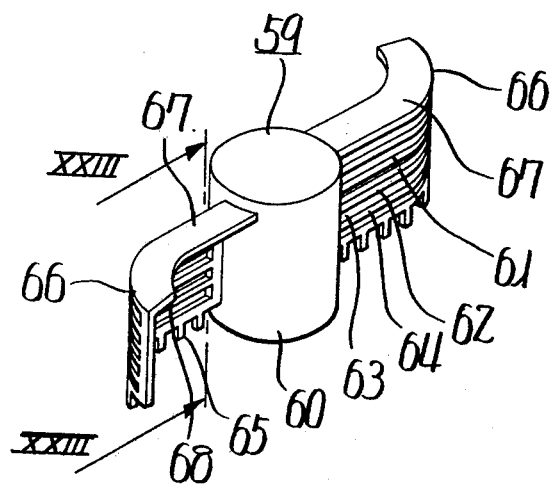
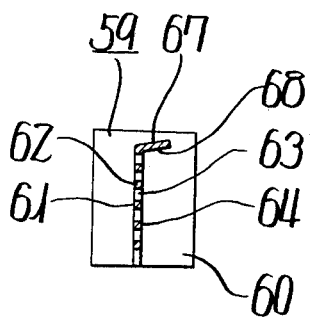
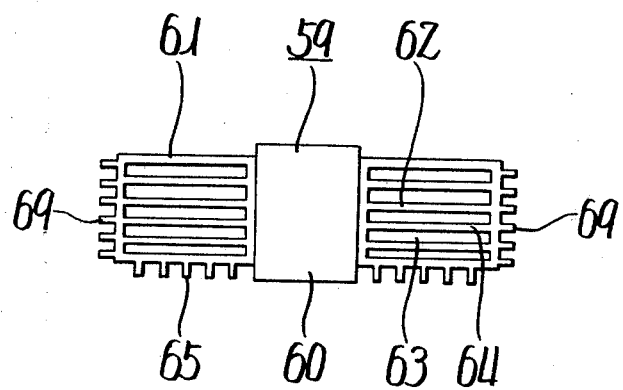

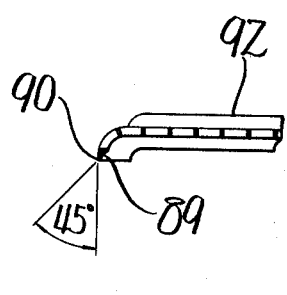
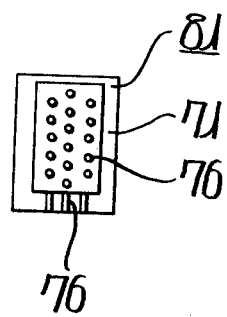
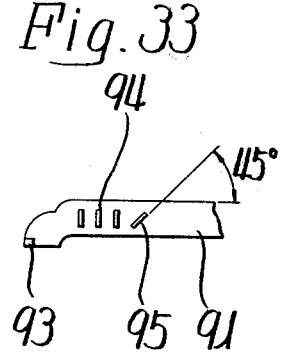
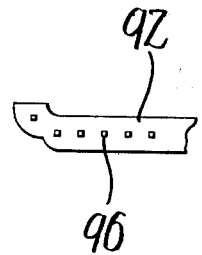
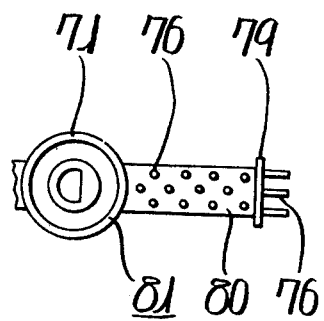

BEATING BLADE MEMBER OF BEATER

BACKGROUND OF THE INVENTION

1. Field of the Invention

The present invention relates to a beating blade of a beater for use in cooking and, more particularly, to a novel construction of a beating blade of a beater capable of sufficiently stirring and efficiently beating materials such as an egg into froth in a short period of time.

2. Description of the Prior Art

Various shapes of beating blades have been proposed and used up to now. For instance, in order to improve the beating or whipping efficiency, there has been used a comb-like blade having a plurality of slit-like openings in its surface. It is aimed that the chance of contact of the cooking material such as an egg with the blade is increased to improve the efficiency of trapping of air and hence the efficiency of beating or whipping. The beater incorporating this type of blades, however, cannot always ensure a good stirring efficiency because the cooking material tends to flow or move along the slit-like opening.

SUMMARY OF THE INVENTION

It is therefore a first object of the invention to provide a beating blade capable of efficiently beating or whipping the cooking material into froth.

It is a second object of the invention to provide a highly efficient beating or whipping by making the cooking material interfere with the beating surface, through guiding the cooking material residing near the inner peripheral surface of a beater vessel to the central portion of the latter.

It is a third object of the invention to provide a beating blade capable of generating a vertical flow of the cooking material in the vessel to render the beating or whipping more efficient.

It is a fourth object of the invention to provide a beating blade with which the cooking material is prevented from passing through the area above the blade without dropping onto the latter, thereby to enhance the chance of the interference of the cooking material with the stirring surface.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein:

FIG. 6 is a perspective view of a beating blade which is a second embodiment of the invention;

FIG. 7 is a perspective view of a beating blade which is a third embodiment of the invention;

FIG. 8 is a perspective view of a beating blade which is a fourth embodiment of the invention;

FIG. 12 is a perspective view of a beating blade which is a sixth embodiment of the invention;

FIG. 13 is a perspective view of a beating blade which is a seventh embodiment of the invention;

FIG. 14 is a perspective view of a beating blade which is an eighth embodiment of the invention;

FIG. 18 is a perspective view of a beating blade which is a tenth embodiment of the invention;

FIG. 19 is a longitudinal sectional view of the beating blade as shown in FIG. 18 by XIX;

FIG. 20 is an enlarged longitudinal sectional side elevational view of a portion of the beating blade as shown in FIG. 18;

FIG. 21 is an enlarged perspective view of a network and comb-teeth of the beating blade as shown in FIG. 18;

FIG. 22 is a perspective view of a beating blade which is an eleventh embodiment of the invention;

FIG. 23 is a longitudinal sectional view of the beating blade as shown in FIG. 2 by XXIII;

FIG. 24 is a front elevational view of a beating blade in which a multiplicity of comb-teeth-like ribs are formed in the peripheral portion of the beating blade;

FIG. 28 is a side elevational view of the beating blade as shown in FIG. 27;

FIG. 29 is a bottom plan view of the beating blade as shown in FIG. 27 with a portion thereof being removed;

FIG. 32 is a horizontal sectional view of a portion of the beating blade as shown in FIG. 30 by XXXII;

FIG. 33 is a plan view of a portion of the beating blade as shown in FIG. 30;

FIG. 34 is a bottom plan view of a portion of the beating blade as shown in FIG. 30.

DETAILED DESCRIPTION OF THE PREFERRED EMBODIMENTS

Figure 1:
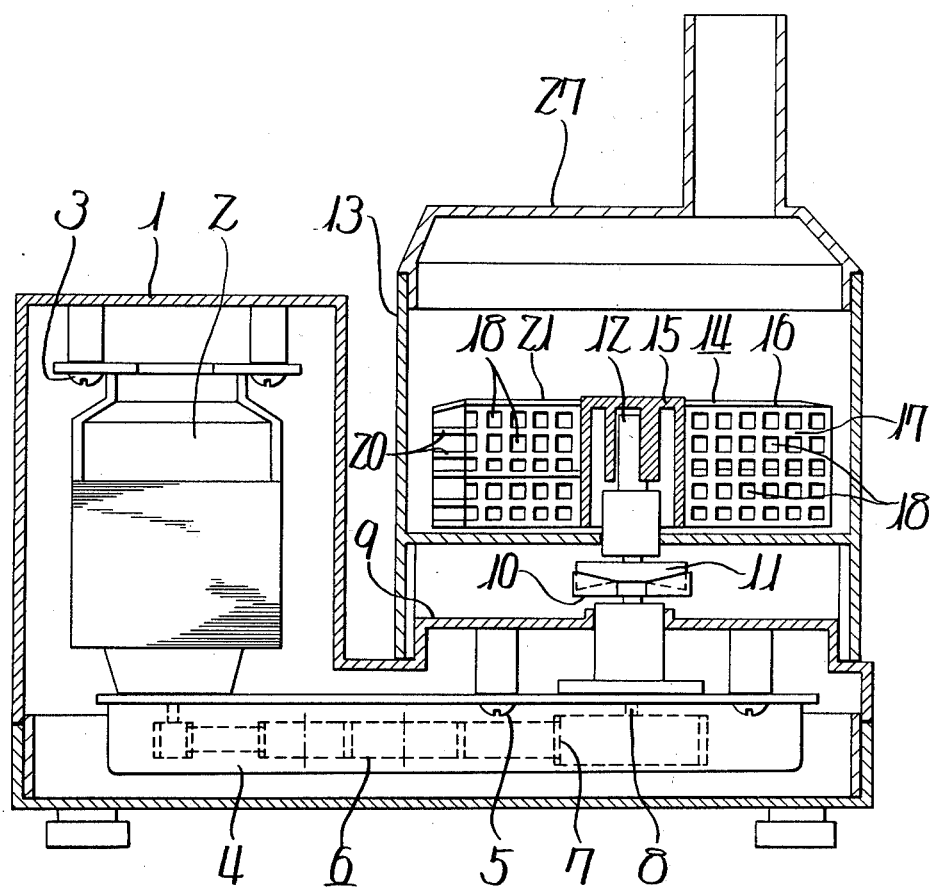
FIG. 1 is a vertical sectional front elevational view of a beater having blades embodying the present invention.
Figure 2:
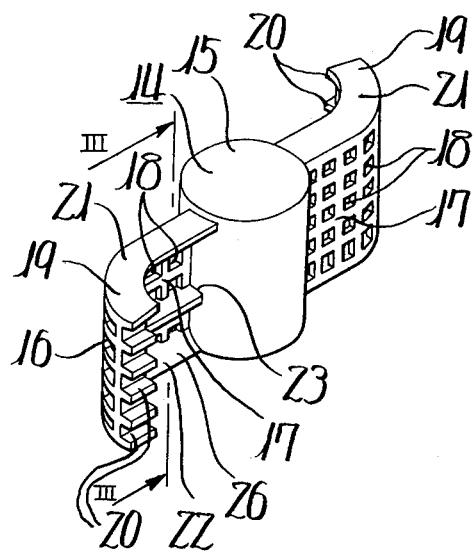
FIG. 2 is a perspective view of a beating blade incorporated in the beater as shown in FIG. 1.
Figure 3:
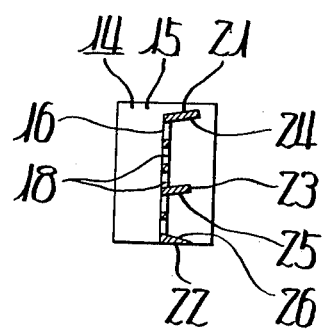
FIG. 3 is a cross-sectional view of the beating blade as shown in FIG. 2 by III.
Figure 4:
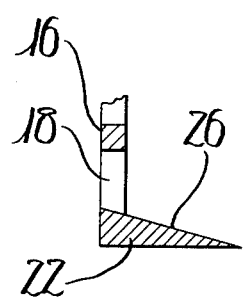
FIG. 4 is an enlarged sectional view of a portion of the beating blade as shown in FIG. 2.
Figure 5:
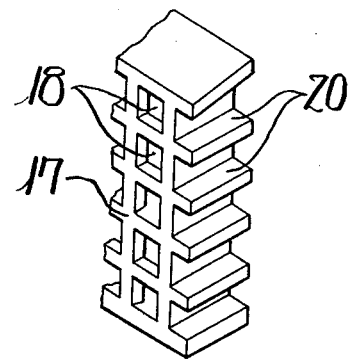
FIG. 5 is an enlarged perspective view of a mesh.

A first embodiment of the invention will be described hereinafter with reference to FIGS. 1 to 5.

Referring to these Figures, a reference numeral 1 denotes a casing of a beater. A motor 2 is fixed by means of screws 3 to one side of the casing 1 and is housed by the latter. A gear box 4 is fixed by means of screws 5 to the bottom of the casing 1 and is housed by the latter. The gear box 4 contains a transmission mechanism 6 including a plurality of gears operatively connected to the motor 2. An output shaft 8 connected to a final gear 7 of the transmission mechanism 6 projects out of the gear box 4 upwardly from the central portion of a vessel mounting portion 9 defined at the other side of the casing 1. The projecting end of the output shaft 8 has a coupling 10. A coupling 11 adapted to be releasably coupled to the coupling 10 is attached to the lower end of a blade shaft 12. The blade shaft is received in a watertight manner by a bore formed in the bottom of a vessel 13 which is detachably held in the vessel mounting portion 9.

A beating blade member 14 is attached to the blade shaft 12. The blade member 14 is allowed to move in the axial direction of the blade shaft 12 along the latter, but is prevented from rotating relatively to the blade shaft 12. The beating blade member 14 has a boss 15 adapted to be coupled to the blade shaft 12 and blades 16 which are formed integrally with the boss 15. Each blade 16 has a beating surface 17 which is stretched in the vertical direction.

A multiplicity of meshes 18 are formed in the beating surface 17. Each blade 16 is curved at its radially outer end portion toward the leading side as viewed in the direction of rotation, as at 19. Further, each blade 16 is provided with a plurality of ribs 20 projecting from the peripheral end thereof, a flange portion 21 extending from the upper edge thereof in toward the leading side as viewed in the direction of rotation, and projecting wedge portions 22, 23 projecting also toward the leading side from an intermediate portion and lower edge thereof, respectively. The lower surfaces of the flange 21 and the web 23 are tapered as at 24, 25, such that the heights of these surfaces from a reference level become large as they get remote from the main part of the blade 16, i.e., toward the leading side ends as viewed in the direction of rotation. On the other hand, the upper surface 26 of the web 22 is tapered downwardly toward the leading side as viewed in the direction of rotation. A lid 27 is detachably secured to the vessel 13.

In operation, after placing a cooking material such as an egg in the vessel 13, the lid 27 is fixed to close the vessel 13 and then the motor 2 is started. The torque of the motor is transmitted to the beating blade member 14 through the transmission mechanism 6, output shaft 8 and the blade shaft 12. As a result, the blade member 14 is driven by the motor 2 and rotated at a high speed. The rotation of the beating blade member 14 causes, not only a large vortex of the whole material to stir the latter, but also a numer of local eddy currents or vortex flows in every part of the material by the action of the meshes 18. At the same time, ambient air is induced by the meshes 18, so that the material is sufficiently mixed with the air to become froth. It is therefore possible to beat or whip the cooking material in quite a short period of time without causing any fatigue of the user's hand.

It has been found that the most efficient mixing and beating are performed when the ratio of the area of the meshes to the whole area of the beating surface 17 is about 60 to 90%. Provided that the width of the grid or lattice forming the meshes is 1 mm, the beat mixing and beating is attained when each mesh has an area of 0.21 cm². Similarly, if the grid or lattice width is 0.6 mm, the beat result is obtained when each mesh has an area of 0.1 cm². With above stated size of the meshes, the best result was observed when the blade assembly 14 is rotated at a speed of 600 to 1200 R.P.M. The curved end portion 19 of each blade 16 effectively forces the cooking material residing near the inner peripheral surface of the vessel 13 to flow toward the center of the vessel to enhance the stirring effect. Also, air is entrapped between the comb-teeth-like ribs 20 of each blade so as to be mixed with the cooking material. Further, the flange 21 of each blade reduces the rate of the upper flow of the cooking material which detours the blade member 14 so as to promote the mixing and beating effect provided by the meshes 18. In addition, the tapered surfaces 24, 25 and 26 in combination generates a vertical component of the flow of the cooking material to enhance the mixing and beating effect. For these reasons, it is possible to obtain a further improved efficiency of beating or whipping work.

It is also advantageous that the blade member 14 has a simple construction constituted by a boss 15 integrated with blades 16. The blade member having the simplified construction can easily be attached to and detached from the blade shaft 12. The cooking material clogging the meshes 18 of the blade 16 can easily be washed away as the meshes are moved two or three times in the water. This blade member 14 is therefore quite easy to handle.

A second embodiment of the invention will be described hereinunder with specific reference to FIG. 6. The beating blade member 28 of this embodiment has blades 30 integrated with a boss 29. Each blade 30 is provided with a beating surface 32 which is stretched or spread in the vertical direction. The blade 30 has a multiplicity of comb-teeth 32 extending in the vertical direction in parallel with one another.

The blade member 28 is adapted to be rotated at a high speed by the motor. As a result, the blade member 28 generates a large vortex of the whole cooking material to stir the latter. At the same time, the cooking material is stirred locally at every portion thereof by the comb-teeth 32. In addition, air is entrapped between the comb-teeth 32 so as to be efficiently mixed with the cooking material. Consequently, it is possible to beat or whip the material into froth in quite a short time, without incurring the fatigue.

FIG. 7 shows a third embodiment of the invention. In this third embodiment, each blade 30 is curved at its radially outer end portion where the peripheral velocity is the greatest, toward the leading side as viewed in the direction of rotation, as at 33. Consequently, the cooking material in the vicinity of the wall of the vessel is forced to flow toward the center of the vessel to enhance the stirring effect. The beating blade member 28 can have a simple construction constituted by a boss 29 and blades 30 integral with the latter, and can easily be attached and detached to and from the blade shaft. The cooking material clogging the space between adjacent comb-teeth 32 can easily be removed by moving two or three times the blade in the water. The blade member of this embodiment, therefore, can be handled quite easily.

Figure 9:
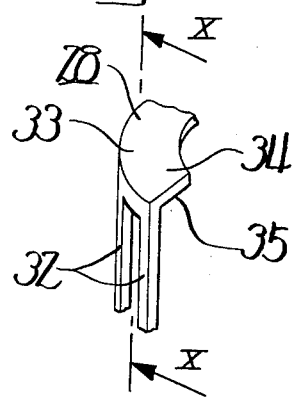
FIG. 9 is a perspective view of a part of the beating blade as shown in FIG. 8.
Figure 10:
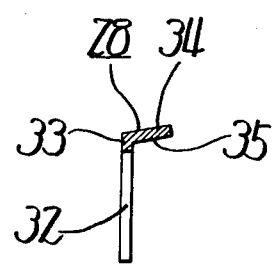
FIG. 10 is a sectional view of the beating blade as shown in FIG. 9 by X.

FIGS. 8 to 10 inclusive show a fourth embodiment of the invention, in which the same reference numerals are used to denote the same parts or members to those of the previously described embodiments, and the description of these parts or members are omitted. The beating blade assembly 28 of this embodiment has blades 30 in each of which formed are comb-teeth 32. The blade 30 also has radially outer end portion 33 which is curved toward the leading side as viewed in the direction of rotation. Further, a flange 34 is formed on the upper edge of each blade 30 to project forwardly therefrom, i.e. toward the leading side as viewed in the direction of the rotation. The lower surface 35 of the flange 34 is tapered upwardly toward the leading side as viewed in the direction of rotation.

In operation, the curved end portion 33 causes an inward flow of the cooking material to enhance the stirring effect. Also, the flange 34 prevents the cooking material from passing above the blade member 28, so as to enhance the chance of interfere of the cooking material with the comb-teeth 32. The tapered lower surface 35 of the flange 34 causes a vertical stirring action. Consequently, the beating or shipping effect is further enhanced.

Figure 11:
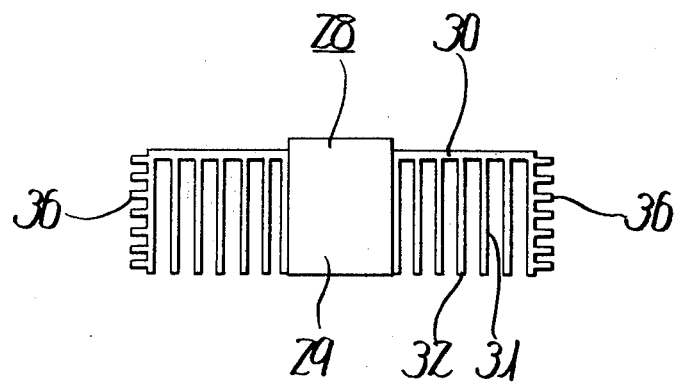
FIG. 11 is a front elevational view of a beating blade which is a fifth embodiment of the invention.

FIG. 11 shows a fifth embodiment of the invention. The beating blade member 28 used in this embodiment has a multiplicity of ribs 36 projecting outwardly from radially outer end of each blade 30. In addition to the whipping effect of the comb-teeth 32 as stated above, stirring is effected locally at every part of the cooking material by the ribs 36 which are situated at the outer extremity of each blade 30 where the peripheral velocity is the greatest. In addition, air is conveniently caught between adjacent ribs 36, so that a more vigorous mixing of the air and cooking material is achieved.

A sixth embodiment of the invention will be described hereinunder with specific reference to FIG. 12. The beating blade member 37 of this embodiment has a boss 38 by which it is connected to the blade shaft and blades 39 integral with the boss 38. Each blade 39 has a vertically stretched beating surface 40 constituted by a multiplicity of laterally extending slit-like bores 41 defined by a grid 42.

In operation, the motor is started after a cooking material such as an egg is placed in the vessel. The beating blade member 37 is rotatively driven by the motor at a high speed. The cooking material as a whole is stirred in the form of a vortex flow. At the same time, the laterally extending slit-like bores 41 and the grid 42 in combination generate local vortex or eddy current of the material at every part of the latter so as to enhance the stirring effect. In addition, air is induced into the bores 41 so as to be efficiently mixed with the cooking material. Consequently, the cooking material and the air is sufficiently mixed to complete the beating or whipping of the cooking material in a short time without incurring fatigue.

FIG. 13 shows a seventh embodiment of the invention. In this embodiment, the radially outer end portion of each blade, where the peripheral velocity is the greatest, is curved toward the leading side as viewed in the direction of rotation, as at 43. This curved end portion 43 of each blade effectively causes a radially inward component of flow of the cooking material so as to further enhance the whipping action. The beating blade member has a simple construction constituted by a boss 38 and blades 39, and can easily be attached to and detached from the blade shaft. The cooking material attaching to the bores 41 and the grid 42 can easily be removed by moving the blade two or three times in the water. The blade member of this embodiment thus can easily be handled.

Figure 15:
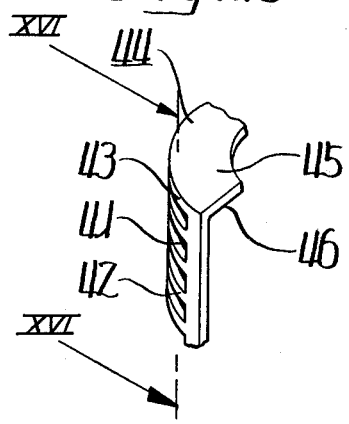
FIG. 15 is a perspective view of a portion of the beating blade as shown in FIG. 14.
Figure 16:
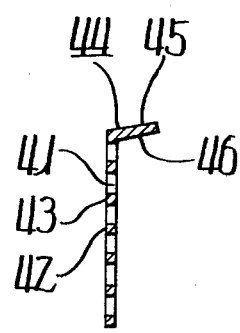
FIG. 16 is a sectional view of the portion of the beating blade as shown in FIG. 15 by XVI.

An eighth embodiment of the invention will be described with reference to FIGS. 14 to 16. The parts or members same as those of the embodiments described before are denoted by the same reference numerals and are not detailed here. The beating blade member 44 of this embodiment has blades 39 in each of which formed is a grid 42 which defines a plurality of slit-like bores 41. The radially outer end portion of each blade is curved as at 43 toward the leading side as viewed in the direction of rotation. A flange 45 is formed unitarily with the blade 39 at the upper edge of the latter to extend forwardly therefrom, i.e. toward the leading side as viewed in the direction of rotation. The lower surface 46 of the flange 45 is tapered upwardly toward the leading side as viewed in the direction of rotation.

In operation, the curved portion 43 of each blade caused an inward flow of the cooking material to enhance the stirring effect. At the same time, the flange 45 prevents the cooking material from passing above the beating blade member 44 thereby to enhance the chance of interefere of the cooking material with the bores 41 and grids 42 of the blades 39. Consequently, the beating or whipping is more efficiently.

Figure 17:
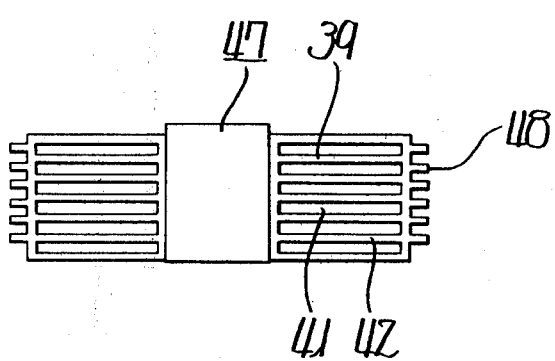
FIG. 17 is a front elevational view of a beating blade which is a ninth embodiment of the invention.

A ninth embodiment of the invention is shown at FIG. 17. The beating blade member 47 as used in this embodiment is provided with a plurality of ribs 48 projecting in the form of comb-teeth from the radially outer end of each blade 39. In operation, in addition to the above described beating or whipping action performed by the bores 41 and grids 42, local stirring is effected at every portion of the cooking material as a whole by the ribs 48 which are disposed at the radially outer extremity of each blade 39 where the peripheral velocity is greatest. In addition, air is conveniently caught between the adjacent ribs 48 so as to permit a more vigorous mixing of the cooking material with the air.

A tenth embodiment of the invention will be described with reference to FIGS. 18 and 21. The beating blade member 49 of this embodiment is provided with a boss 50 through which it is connected to the blade shaft and blades 51 which are formed integrally with the boss 50. Each blade 51 has a vertically stretched beating surface 52 in which formed are a multiplicity of meshes 53. At the same time, the blade 51 is provided with a plurality of comb-teeth 54 extending downwardly therefrom. Further, the radially outer end portion of each blade 51 is curved as at 55 toward the leading side as viewed in the direction of rotation. Further, each blade 51 is provided with a plurality of ribs 56 extending in the form of comb-teeth radially outwardly from the outer extremity thereof, and also with a flange 57 which extends toward the leading side as viewed in the direction of rotation from the upper edge thereof. The flange 57 has a lower end surface 58 which is tapered upwardly toward the leading side as viewed in the direction of rotation.

In operation, the motor is started after a cooking material such as an egg is placed in the vessel. As a result, the the beating blade member 49 is rotatively driven at a high speed by the motor, so that the material as a whole is rotated to form a vortex flow to enhance the stirring. At the same time, the meshes 53 and the comb-teeth 54 imparts local stirring action at every portion of the cooking material. Further, the meshes 53 conveniently traps the air so as to permit a sufficient mixing of the cooking material and air with each other. It is, therefore, possible to beat or whip the cooking material into froth in quite a short period of time, without incurring fatigue of the user's hand.

The best mixing of the cooking material with air is achieved with the ratio of opening area of the meshes 53 to the area of the entire beating surface 52 of about 60 to 90%, opening area of each mesh opening of 0.21 cm² (in this case, the width of grid forming the meshes is 1 mm) or 0.1 cm² (in this case, the width of grid forming the meshes is 0.6 mm) and a revolution speed of the beating blade member falling within the range of between 600 and 1200 R.P.M. Further, by the presence of the curved portion 54 of each blade, the cooking material residing in the vicinity of the inner peripheral surface of the vessel is forced to flow toward the center of the vessel so as to enhance the stirring effect. At the same time, air is caught between adjacent comb-like ribs 56 so as to be mixed efficiently with the cooking material. Further, the flange 57 effectively prevents the cooking material from passing above the blades 51 so as to enhance the mixing action performed by the meshes 53. The tapered lower surface 58 of the flange generates a vertical flow component of the cooking material to promote the stirring. As a result, a more efficient beating or whipping is performed.

In addition, the beating blade member 49 can have a simple construction constituted by a boss 50 and blades 51 integral with the latter, and can easily be attached and detached to and from the blade shaft. The cooking material sticking to the blades 51 can easily be washed away as the blades are moved two or three times in the water. The beating blade member of this embodiment, therefore, can be handled in quite an easy manner.

An eleventh embodiment of the invention will be described with reference to FIGS. 22 and 24. The beating blade member 59 of this embodiment has a boss 60 at which it is connected to the blade shaft and blades 61 formed integrally with the boss 60. The blade 61 has a vertically stretched beating surface 62 in which are formed a multiplicity of laterally extending slit-like bores 63 defined by a grid 64. The blade 61 is also provided with comb-teeth projecting downwardly from the lower edge thereof. Further, the radially outer end portion 66 of the blade 61 is curved toward the leading side as viewed in the direction of rotation. In addition, a flange 67 is formed to extend forwardly, i.e. toward the leading side as viewed in the direction of rotation, from the upper edge of the blade 61. The lower surface 68 of the flange 67 is tapered upwardly toward the leading side as viewed in the direction of rotation. In operation, a cooking material such as an egg is put into the vessel. Then, after attaching the lid, the motor 2 is started. Consequently, the beating blade member 59 is rotatively driven at a high speed to cause a vortex flow of the whole material to stir the latter. Simultaneously, the girds 64 and the comb-teeth 65 generate local vortex flows or eddy currents of the cooking material at every portion of the latter to promote the stirring. At the same time, the bores 63 positively introduce the air to promote a sufficient mixing of the cooking material with air. It is therefore possible to beat or whip the cooking material into froth in quite a short time, without incurring fatigue. Further, the curved portion 66 of each blade 61 acts to cause the cooking material staying in the vicinity of the inner peripheral surface of the vessel to flow toward the center of the latter, so as to further promote the mixing and stirring of the cooking material. In addition, the flange 66 acts to reduce the detouring flow of the cooking material above the blades 61 so as to enhance the mixing effect performed by the blades 61. The tapered lower surface 68 of the flange 66 conveniently generates a vertical component of flow of the cooking material to promote the stirring. The beating or whipping is therefore rendered more efficient. It is also possible to provide a plurality of ribs 69 projecting radially outwardly from the peripheral edge of each blade 61 in comb-teeth-like form, as shown in FIG. 24. By so doing, a more effective stirring action is ensured, because these ribs 69 promote the stirring action and because the air is caught between adjacent ribs 69 to provide a more efficient mixing of the air with the cooking material.

The beating blade member 59 can have a simple construction consisting of a boss 60 and blades 61, and can easily be attached and detached to and from the blade shaft. The cooking material sticking to the blades 61 can be removed easily by moving the blades 61 two or three times in the water. The beating blade 59 thus can be handled in quite an easy manner.

Figure 25:
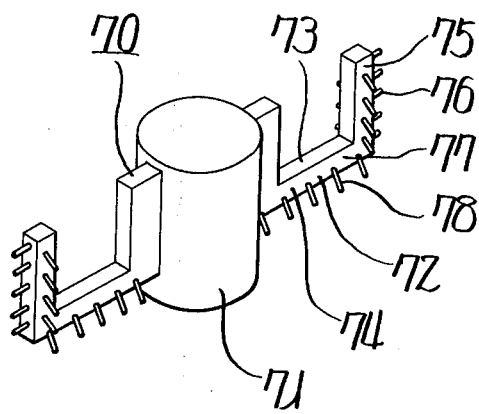
FIG. 25 is a perspective view of a beating blade which is a twelfth embodiment of the invention.
Figure 26:
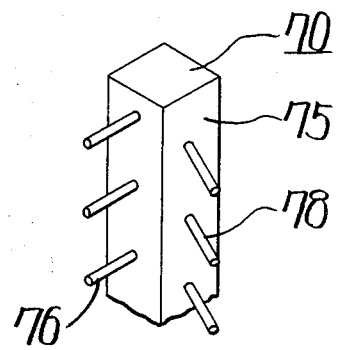
FIG. 26 is an enlarged perspective view of a portion of the beating blade as shown in FIG. 25.

A twelfth embodiment of the invention will be described with reference to FIGS. 25 and 26. The beating blade member 70 of this embodiment has a boss 71 at which it is attached to the blade shaft and stirring blade portions 72. Each stirring blade portion 72 is notched at its central portion to provide recessed portion 73 so as to reduce the resistance by which the blade portions are encountered during the stirring of the cooking material put in the vessel. More specifically, each stirring blade portion 72 is constituted by a laterally extending horizontal portion 74 and a vertical portion 75 extending upward from the outer end of the latter. A plurality of small rods 76 made of nylon or the like material and hence exhibiting a small resistance to the cooking material are provided on the outer extremity of the stirring blade portion 72. At the same time, a plurality of small rods 78 are formed on the stirring surface 77 of each stirring blade portion 72, so as to extend obliquely downwardly at an inclination of 45° to the horizontal plane. The root portions of these small rods 78 are staggered by half pitch from the root portions of the small rods 76.

In operation, a cooking material such as an egg is put in the vessel, and the motor is started after the attaching of the lid. The torque of the motor is transmitted to the beating blade member 70. Since the beating blade member 70 is provided with recessed portions 73 in its stirring blade portion 72, the beating blade member 70 can be rotated at a high speed, because of the reduced resistance. As a result, the small rods 76,78 are rotated at a high speed to splash about the cooking material to stir the latter at a high speed, while inducing air to promote the mixing of the cooking material with air. Consequently, the cooking material is whipped into froth effectively in quite a short period of time. The small rods 76 disposed at the peripheral portion of the beating blade member effectively promote the beating or whipping because of their high peripheral velocity during rotation. The other small rods 78 provided on the beating surface effectively stir the cooking material because they are formed to project obliquely from the beating surface. In addition, since the small rods 76,77 are staggered by half pitch, the splashing stirring action is rendered more vigorous. Since the beating blade member 70 is rotated only in one direction, the beating or whipping can be made without any specific skill, even when the beating blade member 70 is rotated manually. Further, the beating blade member 70 can have a simple construction, because it requires only one boss 71, and can easily be attached and detached to and from the blade shaft. The cooking material sticking to the beating blade portion 72 can easily be washed away by moving the same two or three times in the water.

Figure 27:
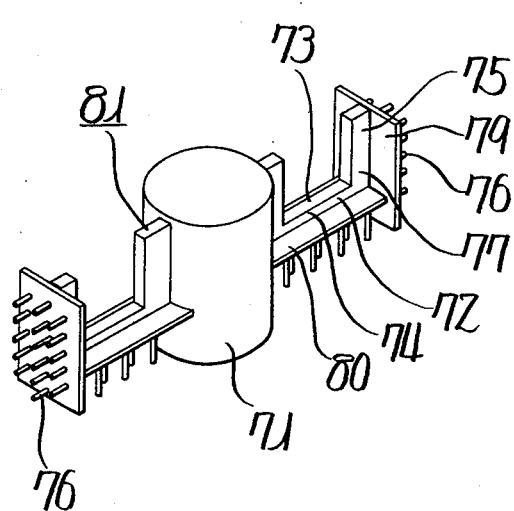
FIG. 27 is a perspective view of a beating blade which is a thirteenth embodiment of the invention.
Figure 30:
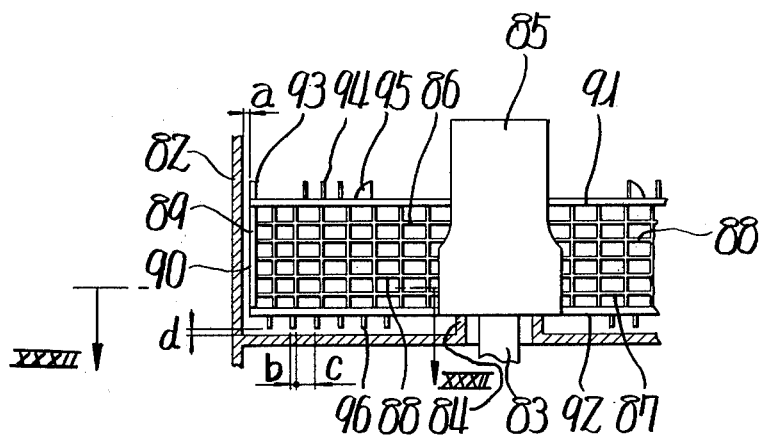
FIG. 30 is a front elevational view of a beating blade which is a fourteenth embodiment of the invention.
Figure 31:
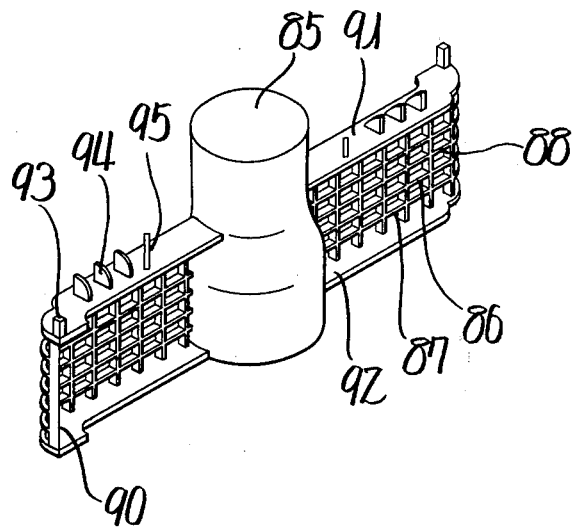
FIG. 31 is a perspective view of the beating blade as shown in FIG. 30.

FIGS. 27 to 29 in combination show a thirteenth embodiment of the invention. The parts or members the same as those of the previously described embodiment are denoted by the same reference numerals and are not detailed here. In this embodiment, tabular members 79,80 of substantial areas are fixedly attached to the outer edge and lower edge of the stirring blade portion 72. In addition, a plurality of rows of small rods 76 are formed on these tubular members 79,80. These rows are staggered by a half pitch. Thus, the beating blade member 81 of this embodiment can have a larger number of the small rods 76 and hence can provide a further efficient beating or whipping action.

Finally, a fourteenth embodiment of the invention will be described with reference to FIGS. 30 to 36. At the center of the bottom of a vessel 82, formed is a cylinder 84 from which projected is a spindle 83 operatively connected to a reduction gear. A boss 85 having a cylindrical form with closed upper end is fitted around the cylinder 84. The boss carries blades 86 formed unitarily therewith. Needless to say, it is possible to fabricate the boss 85 and the blades 86 as separate bodies and to assemble them into a beating blade member. The boss 85 is attached to the spindle 83 for free axial displacement but is prevented from rotating relatively to the latter. Each blade 86 extends radially outwardly from the boss 85 and has a beating surface 87. The beating surface 87 is curved toward the leading side as viewed in the direction of rotation. Meshes 88 are formed in each beating surface 87. The distance a between the radially outer extremity of the beating surface 87 and the inner peripheral surface of the vessel 82 is selected to be 1 mm. At the peripheral portion of the beating surface 87, is formed an inclined surface 89 which is inclined toward the leading side of rotation by an angle of 45°. The outer extremity of this inclined surface 89 terminates in an edge 90. An upper and a lower flanges 91,92 are formed on each beating surface 87 so as to oppose to each other. The upper flange 91 has a projection 93 which extends on the extension of the edge 90 to oppose to the inner peripheral surface of the vessel 82 with a small distance a of 1 mm, and a plurality of comb-teeth-like ribs 94. At least the innermost one of the ribs 94 has a tapered surface 95 which is tapered radially outwardly toward the leading side as viewed in the direction of rotation at an angle of 45°. The lower flange 92 is provided with a plurality of comb-like ribs 96. The ratio of the breadth b of each rib 96 to the distance c between adjacent rib 96 is given by the equation of:

$b:c = 1:3.$

The distance d between the rib 96 and the bottom surface of the vessel 82 is 1 mm.

Figure 35:
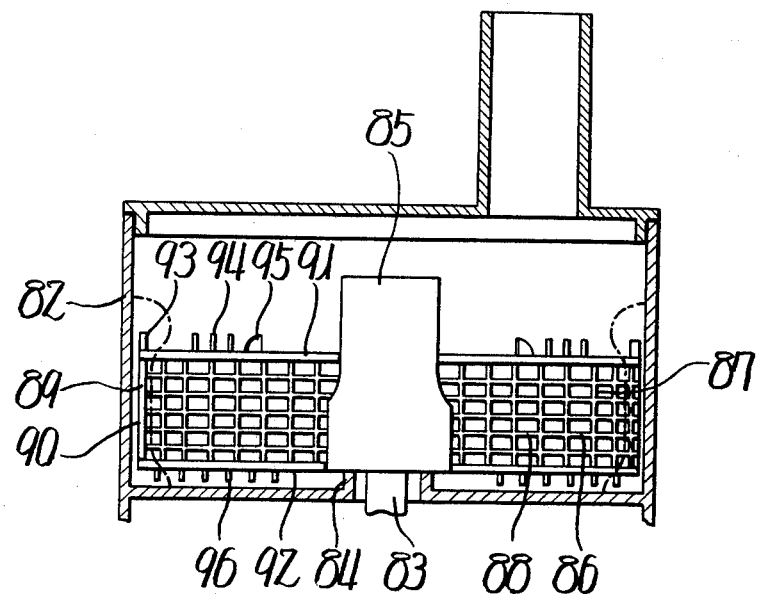
FIGS. 35 and 36 are vertical sectional front elevational views of a beater illustrating the stirring action.
Figure 36:
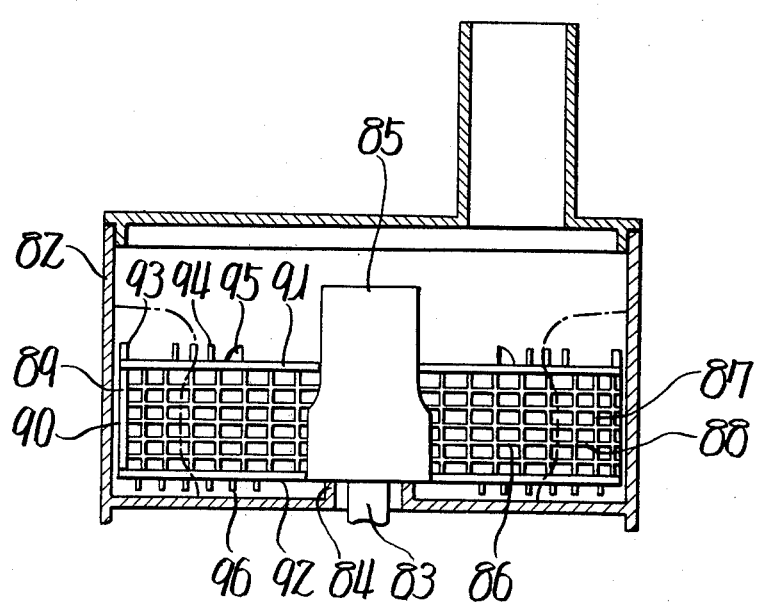

In operation, for preparing a mayonnaise for example, the material is put into the vessel 82, and the motor is started to rotatively drive the boss 85 together with the blades 86. As a result, the beating surface 87 stirs the material as a whole in the circumferential direction. During this stirring action, the meshes 88 generates local vortex or eddy currents of the material at every portion of the latter and induce the ambient air to effectively perform the beating or whipping. The material tends to stick to the inner peripheral surface of the vessel 82, particularly when the viscosity is high. The sticking material, however, is effectively scraped off by the edge 90 of each blade which are positioned in the close proximity of the inner peripheral surface of the vessel. The scraped material is then moved toward the center of the vessel 82, and is then directed radially outwardly. When the amount of the material placed in the vessel is not so large, the material is raised above the radially outer end portion of the blades 86, as shown in FIG. 35. This raised material, however, is effectively stirred by the projection 93 which is located at a distance of 1 mm from the inner peripheral surface of the vessel 82. It will be seen that an effective beating or whipping can be performed even with a small amount of material. At the same time, the ribs 96 formed on the down surface of the flange 92 acts to further promote the beating or whipping. The beating or whipping will be further rendered vigorous by arranging such that the ribs 96 on one of the blades is staggered in the radial direction from the ribs 96 on the other blade, i.e. such that the ribs at both sides of the boss 88 are staggered in the radial direction.

As the amount of the material placed in the vessel 82 is increased, the swell of the material above the beating blade member 89 is gradually moved toward the center of the vessel. This swell is effectively stirred by the ribs 94. Particularly, the air and the material colliding with the inclined surfaces 95 of the ribs 94 are introduced inwardly and effectively mixed with each other. It is therefore possible to beat and whip the material effectively into froth, even with a large amount of the material.

Obviously, numerous modifications and variations of the present invention are possible in light of the above teachings. It is therefore to be understood that within the scope of the appended claims, the invention may be practiced otherwise than as specifically described herein.

What is claimed is:

1. A beating blade member for a beater comprising:
a boss disposed at the center of a vessel;
means for rotatively driving said boss, operatively connected thereto;
a plurality of blades carried by said boss, each of said blades including a vertically stretched and radially extending beating surface in which are formed a multiplicity of meshes; and
flange means projecting from the upper edge of each of said blades toward the leading side as viewed in the direction of rotation, said flange means directing an upper portion of a material to be mixed in said vessel downward across the blades.

2. A beating blade member for a beater comprising:
a boss disposed at the center of a vessel;
means for rotatively driving said boss, operatively connected thereto;
a plurality of blades carried by said boss, each of said blades having a vertically stretched and radially extending beating surface in which are formed a multiplicity of meshes; and
at least one tapered surface means formed on each of said blades, said tapered surface means being tapered upwardly or downwardly toward the leading side as viewed in the direction of rotation, and said tapered surface means generating vertical flows of material to be mixed in said vessel.

3. A beating blade member for a beater comprising:
a boss disposed at the center of a vessel; and
means for rotatively driving said boss, operatively associated with said boss;

a plurality of blades carried by said boss, each of said blades having a vertically stretched and radially extending beating surface in which formed are a multiplicity of meshes; and a plurality of comb-teeth like ribs formed on the peripheral end edge of each of said blades.

4. A beating blade member as claimed in claim 1, 2 or 3, wherein the ratio of the area of the meshes to the whole area of the beating surface is in the range of 60% to 90%.

* * * * *